United States Patent
Madsen

[11] Patent Number: 5,953,467
[45] Date of Patent: Sep. 14, 1999

[54] SWITCHABLE OPTICAL FILTER

[75] Inventor: Christi Kay Madsen, South Plainfield, N.J.

[73] Assignee: Lucent Technologies Inc., Murray Hill, N.J.

[21] Appl. No.: 08/935,585

[22] Filed: Sep. 23, 1997

[51] Int. Cl.[6] .................................................. G02B 6/26
[52] U.S. Cl. ............................ 385/15; 385/16; 385/20; 385/37; 385/46; 372/20
[58] Field of Search .............................. 385/15, 1, 2, 3, 385/4, 8, 9, 10, 12, 13, 14, 16, 17, 18, 20, 31, 46, 37, 48; 372/20

[56] References Cited

U.S. PATENT DOCUMENTS

| | | | |
|---|---|---|---|
| 5,444,724 | 8/1995 | Goto | 372/20 |
| 5,832,155 | 11/1998 | Rasch et al. | 385/48 |

*Primary Examiner*—Phan Palmer
*Attorney, Agent, or Firm*—Mathews, Collins, Shepherd & Gould, P.A.

[57] ABSTRACT

In accordance with the invention, a switchable optical filter comprises an optical splitter coupled to an input waveguide, one or more output waveguides and a plurality of interferometer waveguides. A multiwavelength signal from the input waveguide is split into plural identical multiwavelength split signals which are directed into the interferometer waveguides. In the interferometer waveguides, a sequence of controllable phase shifters and reflective filters reflects specific wavelength signals from a respective interferometer waveguide into the splitter and then to a respective output waveguide. In a preferred embodiment, the splitting device comprises a directional coupler, and the filter comprises a Mach-Zehnder interferometer with a mid section including an alternating sequence of a phase shifter on at least one arm and reflective filters on each arm. The filter is particularly useful as a gain equalization filter, an ADM filter and in an optical cross connect. In alternative embodiments, the splitting device can be a multimode interference coupler or a star coupler.

15 Claims, 5 Drawing Sheets

SWITCHABLE OPTICAL FILTER

FIELD OF THE INVENTION

This invention relates to optical waveguide filters and, in particular, to a switchable optical filter particularly useful for gain equalization, for adding and dropping optical channels, and for optical cross-connection.

BACKGROUND OF THE INVENTION

In optical wavelength division multiplexed communication systems (WDM systems), an optical fiber simultaneously carries many different communications channels in light of respectively different wavelengths. In WDM systems it is desirable to ensure that all channels have nearly equivalent signal-to-noise ratios. To help achieve this equation, gain equalization filters are disposed at various points along the system to control the relative power levels in respective channels.

Dense WDM systems require special add/drop multiplexer filters (ADM filters) to add and drop particular channels (wavelengths). At each node in the system, certain wavelengths on one fiber must be dropped onto a second fiber and channels from a third fiber must be added. The filters to accomplish this task advantageously have sharp roll-off characteristics to minimize cross-talk between channels and interference between an incompletely dropped channel and an added channel. Flat passband characteristics are also desirable since they tolerate more variation in the source wavelength and maintain a finite passband width after concatenating many devices.

A proposed ADM filter using Bragg gratings in Mach-Zehnder interferometers ("MZIs") is described by T. Erdogan et al in "Integrated Optical Mach-Zehnder Add-Drop Filter Fabricated by a Single UV-Induced Grating Exposure", *Proceedings of Optical Fiber Conference*, San Jose, Calif. (February 1996). In essence the device comprises a plurality of concatenated MZIs (one stage for each add/drop wavelength), each MZI including a Bragg grating in each arm.

While the proposed Erdogan et al. filter has advantages of passband flatness, sharp rolloffs and a high rejection in the passband, it suffers excess loss at shorter wavelengths. Such loss is due to coupling to radiation modes. Short wavelength loss becomes a limiting factor when the wavelength range covered by the system channels becomes large. Longer gratings are required to ensure that dropped wavelengths do not interfere with subsequently added channels in the concatenated system. This increased length is undesirable in planar waveguide implementations. Accordingly there is a need for an improved switchable filter.

SUMMARY OF THE INVETION

In accordance with the invention, a switchable optical filter comprises an optical splitter coupled to an input waveguide, one or more output waveguides and a plurality of interferometer waveguides. A multiwavelength signal from the input waveguide is split into plural identical multiwavelength split signals which are directed into the interferometer waveguides. In the interferometer waveguides, a sequence of controllable phase shifters and reflective filters reflects specific wavelength signals from a respective interferometer waveguide into the splitter and thence to a respective output waveguide. In a preferred embodiment, the splitting device comprises a directional coupler, and the filter comprises a Mach-Zehnder interferometer with a mid section including an alternating sequence of a phase shifter on at least one arm and reflective filters on each arm. The filter is particularly useful as a gain equalization filter, an ADM filter and in an optical cross connect. In alternative embodiments, the splitting device can be a multimode interference coupler or a star coupler.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and, except for the graphs, are not to scale.

DETAILED DESCRIPTION

Figure 1:
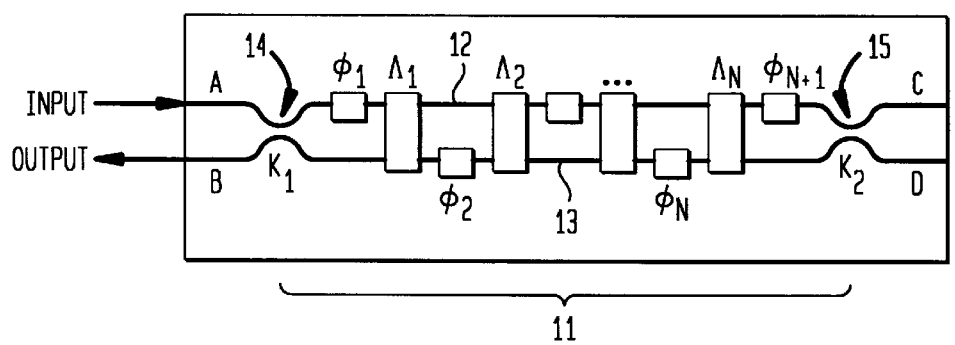
FIG. 1 is a schematic illustration of a switchable optical filter configured for use as a gain equalization filter.

Referring to the drawings, FIG. 1 schematically illustrates a switchable optical filter 10 configured for use as a gain equalization filter. The filter 10 comprises a Mach-Zehnder interferometer 11 comprising a pair of waveguide arms 12, 13 extending between a pair of couplers 14, 15. The mid-section of the MZI (the portions of the arms between couplers 14, 15) includes plural phase shifters $\phi_1, \phi_2, \ldots \phi_{N+1}$ alternating with passive Bragg gratings $\Lambda_1, \Lambda_2, \ldots \Lambda_N$. The filter has reflected ports designated A, B and transmitted ports C, D. The Bragg gratings can be UV-induced Bragg gratings, each simultaneously formed in both arms as described in U.S. Pat. No. 5,636,309 issued to C. H. Henry et al. on Jun. 3, 1997, which is incorporated herein by reference. The phase shifters can be heated thermo-optic phase shifters which provide a phase change proportional to temperature as follows:

$$\phi_n = \frac{2\pi}{\lambda_n}\left(\frac{dn}{dT}\Delta T\right)L_{Htr} \quad (1)$$

where $L_{Htr}$ is the length of the heater, $\Delta T$ is the temperature change, and dn/dT is the effective index change of the fundamental mode with respect to temperature. Other phase control mechanisms may be used such as introducing small sections of nonlinear polymers for changing the phase via the electro-optic effect (See W. Wang et al. "40-GHz polymer electrooptic phase modulators," *IEEE Photon Technol.*

Lett., Vol. 7, No. 6, pp. 638–640 (1995)). In addition, these architectures may be realized in other material systems besides doped-silica such as in GaAsP where current injection can be used to change the phase or LiNbO$_3$ where the electro-optic effect may be used. A passive device can be made by permanently setting the phases, for example, by using UV light to induce changes in the index in germanium and phosphorus doped silica waveguides.

In general, the reflected outputs (A and B) and the transmitted outputs (C and D) depend on the power coupling ratios ($\kappa_1$ and $\kappa_2$), the relative phase differences between the arms and the grating characteristics. The transfer functions for the reflected paths with an input at A are given as follows:

$$A = \sum_{n=1}^{N} [(1-\kappa_1)e^{i\Phi_n} - \kappa_1] R_n(\lambda) \quad (2)$$

$$B = \sum_{n=1}^{n} i\sqrt{(1-\kappa_1)\kappa_1} (e^{i\Phi_n} + 1) R_n(\lambda) \quad (3)$$

where $R_n(\lambda)$ is the amplitude reflection of the grating with Bragg wavelength at $\lambda_n$ and the total phase for each reflected wavelength is given as follows:

$$\Phi_n = 2\sum_{m=1}^{n} (-1)^{m+1} \phi_m \quad (4)$$

It is assumed that the grating transmits perfectly at all wavelengths not equal to its Bragg wavelength and reflects perfectly at its Bragg wavelength. This is effectively obtained by placing the gratings in the order of smallest Bragg wavelength first so that transmission through the short wavelength side of any grating is avoided. The output powers are equal to the square magnitudes of the above transfer functions. If the first coupler is exactly $\kappa_1=50\%$, then the reflected outputs have a spectral response given by $$|A(\lambda_n)|^2 = \sin^2\left(\frac{\Phi_n}{2}\right) \quad (5)$$

$$|B(\lambda_n)|^2 = \cos^2\left(\frac{\Phi_n}{2}\right) \quad (6)$$

Consequently, the output for any given channel can be fully reflected in the A output, fully in the B output, or split between the outputs.

For gain equalization, the filter functions as a two port device with input on A and output on B. The reflection of the nth wavelength in the output port is controlled by changing the phase $\phi_n$ to obtain the desired value. By varying $\phi_n$ and $\phi_{n+1}$ simultaneously, the remaining channels will not be affected. Several channels may be included in one grating by chirping the grating to provide a wider reflection band. In this manner, wavelength bands could be equalized instead of individual channels.

Figure 2:
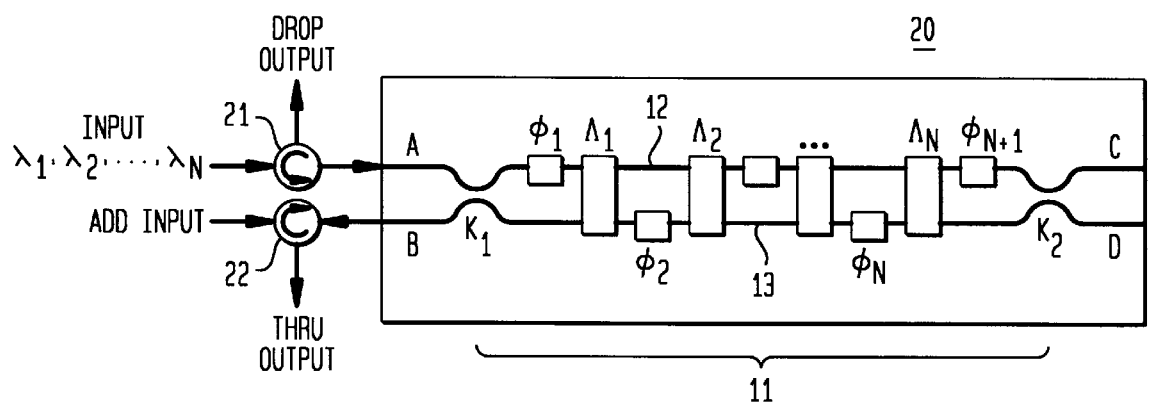
FIG. 2 is a schematic illustration of a switchable optical filter configured for use as an ADM filter.

FIG. 2 shows the switchable filter configured for ADM functionality. The ADM filter 20 is similar to the filter of FIG. 1 except optical circulators 21, 22 have been added to one directional coupler to provide additional ports. For add/drop operation, $\Phi_n$ for the wavelength to be dropped should be set to $\pi$ so that $|A|^2=100\%$ and $|B|^2=0\%$ and the channel is dropped. By correctly setting the phase, it is possible to get 100% reflection in the dropped port and 0% in the thru port independent of the coupling ratio $\kappa_1$ based upon Eq. (3). Optical circulators 20, 21 are needed for separating the drop channels from the input and the thru output from the add channels, respectively. The optical circulators may be discrete components or integrated on the planar waveguide.

Any channels which do not have an associated grating in FIG. 2 will be output at port D. The Thru port output and the output of port D may be combined using a coupler to multiplex both sets of channels onto a single fiber. In this case, however, the transmission properties of the grating would have to attain a high degree of isolation so that the channels output in the Thru port would not see multi-path interference when combined with the port D output. The same comment applies if the port D output were combined with the Drop output.

The advantage of this architecture over a conventional single-stage MZI filter is that shorter gratings are required since the thru output depends only on the reflection properties of the gratings and not on their transmission characteristics. Operating solely in reflection also avoids radiation mode coupling problems. By applying the phase control for the reflected path, only half the phase change is required compared to the transmissive case, thus only half the heater power is required compared to conventional switches using thermo-optic phase shifters in MZIs. By widening the reflection band of the gratings, for example by chirping, wavelength bands may be added and dropped instead of operating on a channel basis only. This further shortens the overall device and offers additional flexibility for system design.

Figure 3:
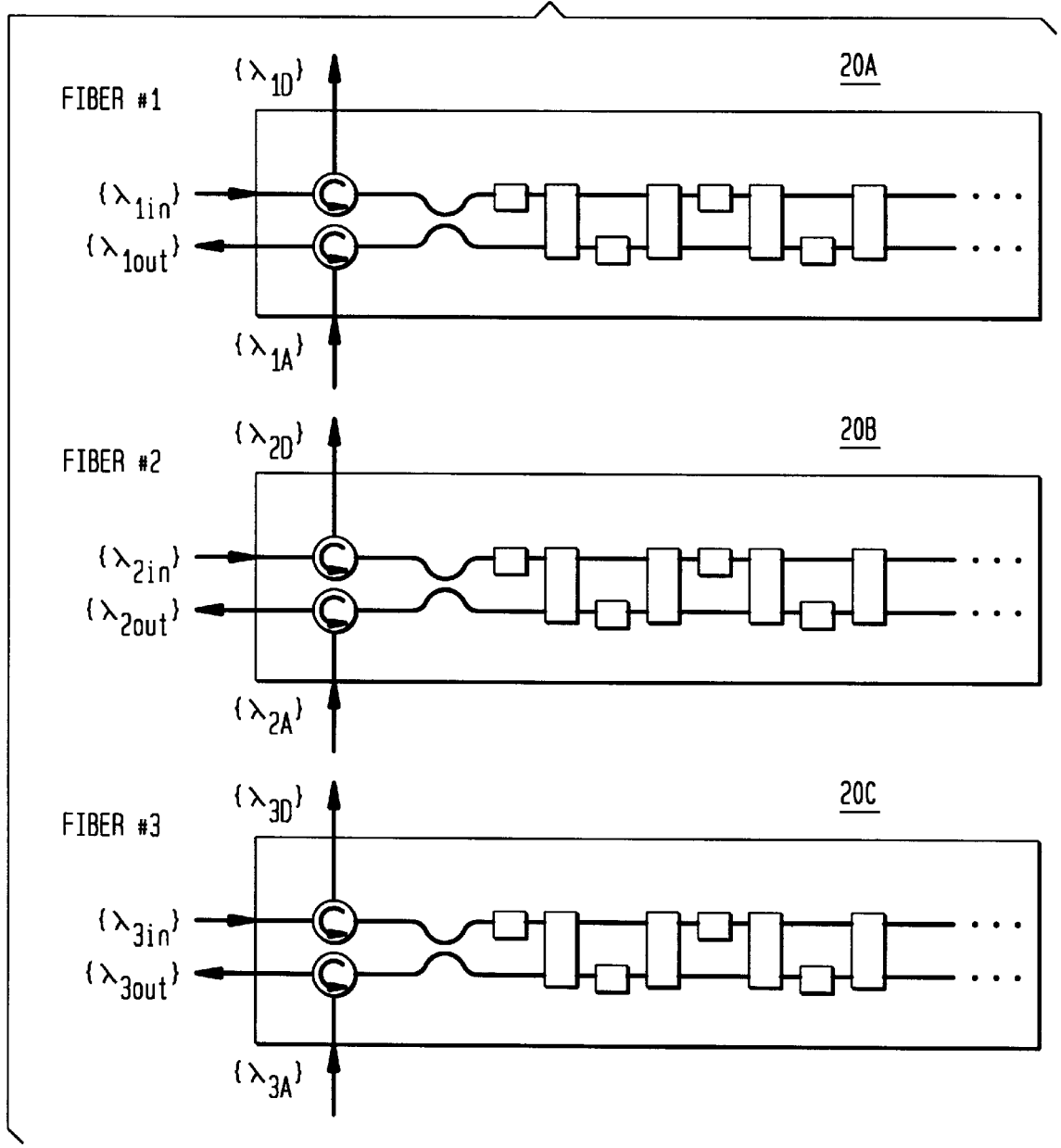
FIG. 3 illustrates the use of switchable optical filters in an optical cross-connect arrangement for a WDM system.

As shown in FIG. 3, several switchable filters 20A, 20B, 20C can be serially connected via their circulators to provide optical cross-connect functionality. Optical circulators are required on each reflective output port. A set of wavelengths to be dropped from fiber #3 are passed to the filter of fiber #2. Any wavelengths to be added to fiber #2 are reflected to its output port, other wavelengths pass through to its drop port which goes to the filter of fiber #1. This concatenation of filters can be done for an arbitrary number of fibers, M. The dropped channels from fiber #1 then are passed to the add input of the filter of fiber #M.

Figure 4:
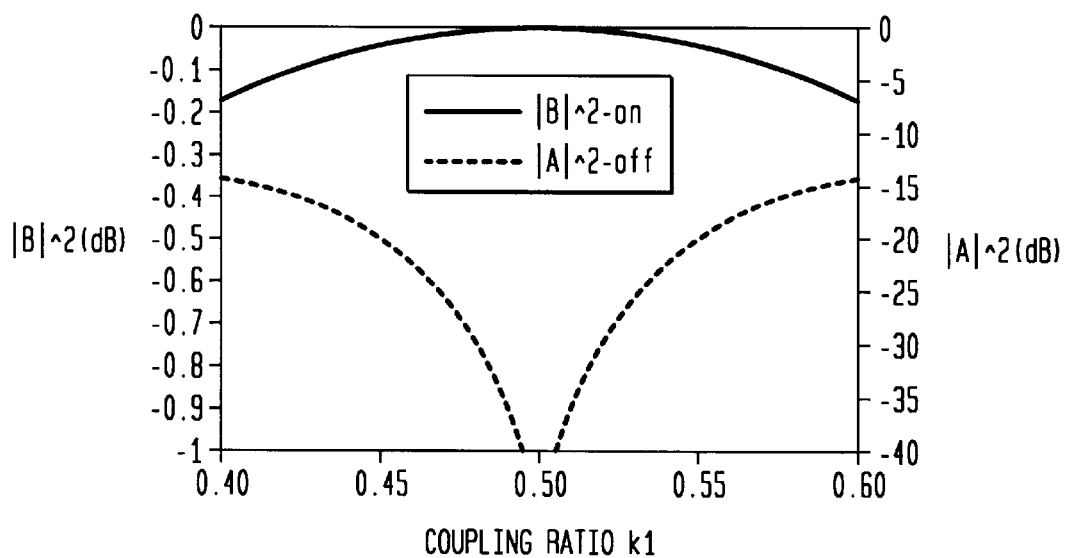
FIG. 4 is a graphical illustration showing for a switchable optical filter, the dependence of the thru-port transmission and the drop-port isolation on the coupling ratio.
Figure 5:
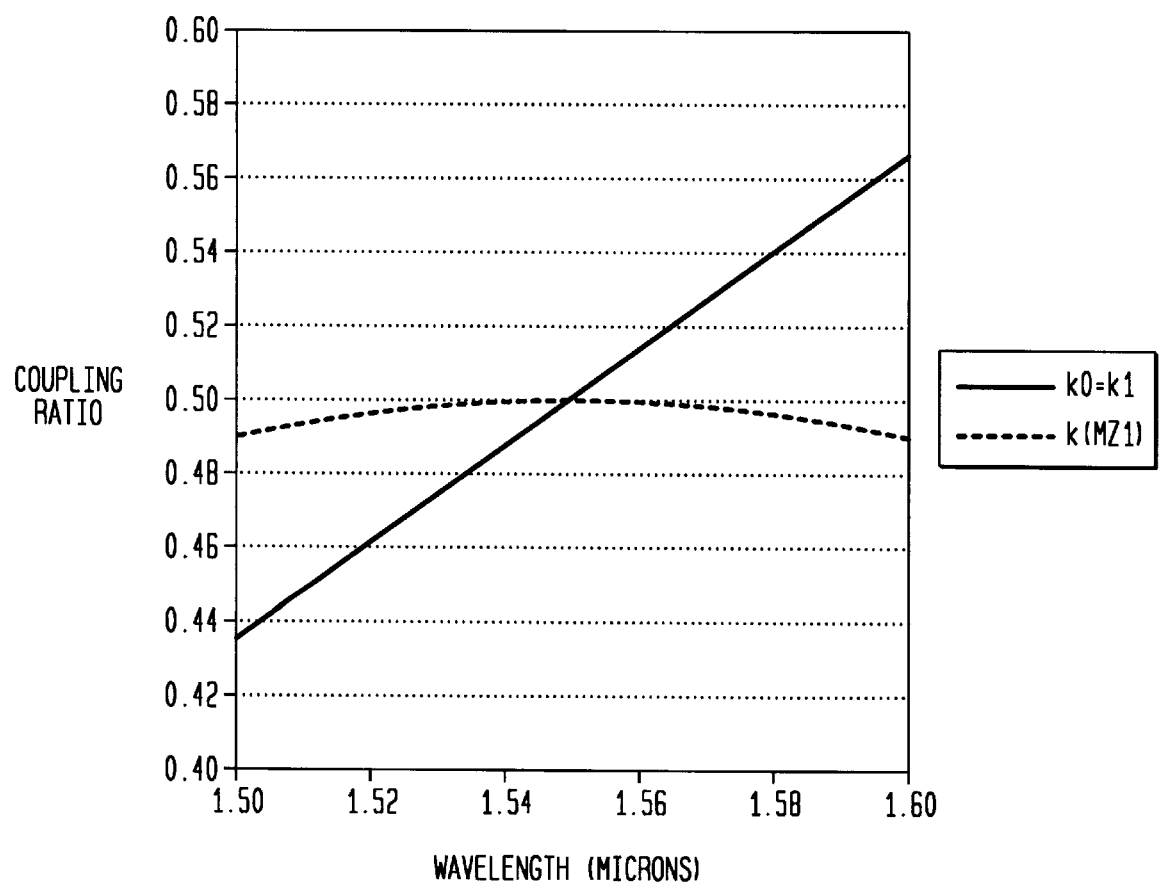
FIG. 5 is a graphical illustration showing the wavelength dependence of an exemplary switchable optical filter.

FIG. 4 is a graphical illustration showing the dependence of thru-port transmission $|B|^2$ and drop-port isolation $|A|^2$ on the coupling ratio $K_1$. For the optical cross-connect architecture, it is desirable to have high isolation of the thru channels in the drop port and vice versa. As can be seen, the isolation of the thru channels in the drop port, however, depends on the coupling ratio $\kappa_1$. An isolation of 40 dB in the drop port and very little loss in the thru port can be attained if the coupling ratio is within the range of 50%±0.5%. For a nominal coupling ratio of $\kappa=50\%$, manufacturing variations introduce uncertainties on the level of ±5%. This limits the achievable isolation to only 20 dB. An additional consideration is the wavelength dependence of a coupler as shown in FIG. 5 for a representative coupler designed for 50% splitting at 1550 nm. The wavelength dependence adds a variation of ±2% over 20 nm and consequently limits the isolation to 30 dB over wavelength ranges of interest for add/drop filters even for a coupler with $\kappa=50\%$.

Figure 6:
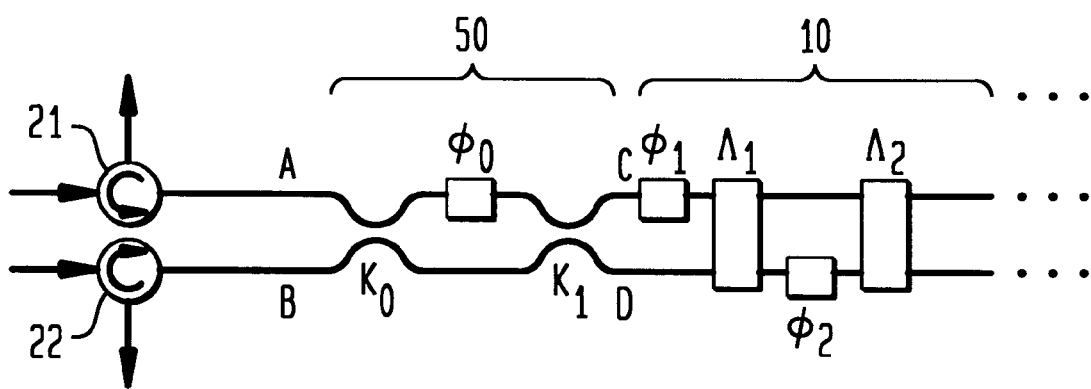
FIG. 6 illustrates a high isolation form of the switchable optical filter particularly useful in the cross-connect architecture of FIG. 3.

To overcome both the manufacturing variations and wavelength dependence of the coupling ratios, the architecture in FIG. 6 is preferred. By adding an MZI 50 with an adjustable phase shifter $\phi_0$ on the front end, the deviation of the couplers $\kappa_0$ and $\kappa_1$ from their desired value of 50% can be compensated by changing the phase $\phi_0$. When $\phi_0$ is appropriately set, the power from either input port A or B will be equally split between the output ports C and D. Then the subsequent phases can be set to either send their associated wavelength to output port A or B with complete nulling of the wavelength in the unwanted output port. The effective coupling ratio for an MZI with $\kappa_0 \neq \kappa_1 \neq 50\%$ at 1550 nm is shown by the dashed line in FIG. 5. The wavelength dependence is greatly reduced over the single coupler. Furthermore, even for $\kappa_0 \neq \kappa_1 \neq 50\%$, a suitable phase can be found to provide an effective 50% split to the output ports as long as $\kappa_0$ and $\kappa_1$ are in the range of 15% to 85%, which is much larger than the manufacturing variations.

The 2-input by 2-output architectures described so far can be generalized to create N×N devices. For the N×N case, the directional couplers can be replaced by either a star coupler or a Multi-Mode Interference (MMI) coupler.

Figure 7:
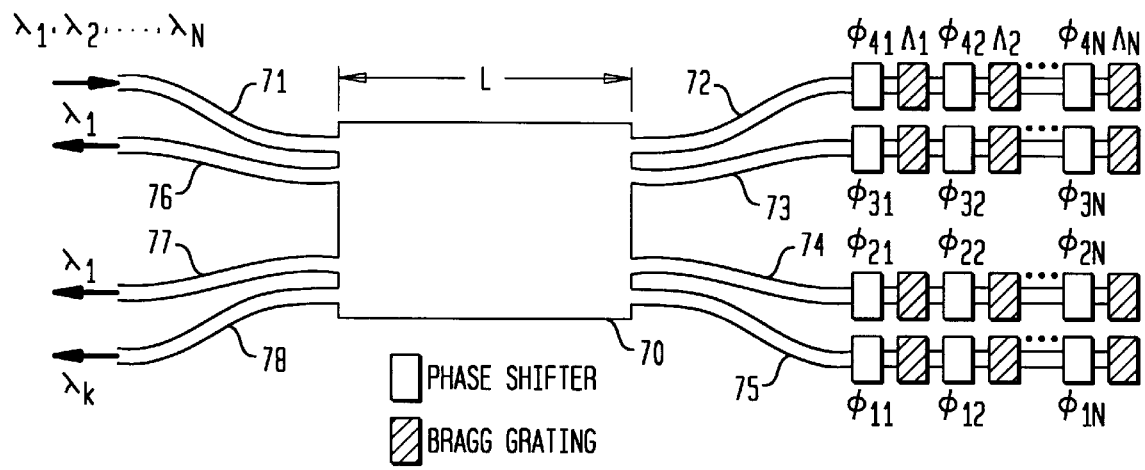
FIG. 7 schematically depicts an alternative embodiment of a switchable optical filter employing a multimode interference coupler.

FIG. 7 is an alternative embodiment of a switchable filter using a 4×4 MMI coupler 70. The structure and operation of a MMI are well known. See L. Soldano et al, "Optical Multi-Mode Interference Devices Based on Self-Imaging: Principles and Applications," *J. of Light. Technol.*, vol. 13, no. 4, pp. 615–627, 1995. All of the channels on a given input fiber 71 enter the device at the top left. The length of the MMI coupler is designed so that N images are formed at the right. The length is roughly given by $$L \approx \frac{4n_c w_e^2}{N\lambda},$$

where $n_c$ is the refractive index of the core, $W_e$ is an effective width of the coupler, $\lambda$ is the average wavelength of the channels, and N is the number of outputs. Each waveguide on the right e.g. 72, 73, 74, 75 contains alternating phase shifters $\phi_1$ and Bragg gratings $\Lambda_i$. (These waveguides can be referred to as the interferometer waveguides). Upon reflection from grating $\Lambda_i$ and transmission back through the coupler, the phase difference between the recombining signals determines the focal point and consequently the respective output waveguide 76, 77, 78, . . . to which a particular waveguide goes. By changing the relative phase differences for the reflected light in each waveguide on the right, the output port can be varied. The phase relations are as follows:

$$\phi_j = \frac{\pi}{8N}[(2N-j)j] \text{ for } j+1 \text{ odd} \tag{7}$$

$$\phi_j = \frac{\pi}{2} + \frac{\pi}{8N}[(2N-1+j)(1-j)] \text{ for } j+1 \text{ odd} \tag{8}$$

where j is the jth waveguide on the right starting at the bottom. Since the light passes through the phase shifter twice, the relative phases in equations 7 and 8 are half of those required for a device operating in transmission. A constant phase factor can be added to all ports without affecting the device's performance. The phases for each output are given for the 4×4 case in Table 1. The largest relative phase difference between the ports determines the maximum phase shift required. The largest difference in phase, i.e. max($\phi$j)-min($\phi$j), which has to be created by any individual phase shifter is $5\pi/8$. For thermo-optic heaters, a phase change of $2\pi$ typically requires around 1 W. The maximum power on any heater for this example would be approximately 0.3 W.

TABLE 1

| | Phases for 4×4 MMI Coupler | | | |
|---|---|---|---|---|
| Output | φ1 | φ2 | φ3 | φ4 |
| 1 | π/2 | 3π/8 | −π/8 | π/2 |
| 2 | 3π/8 | π/2 | π/2 | −π/8 |
| 3 | −π/8 | π/2 | π/2 | 3π/8 |
| 4 | π/2 | −π/8 | 3π/8 | π/2 |

Figure 8:
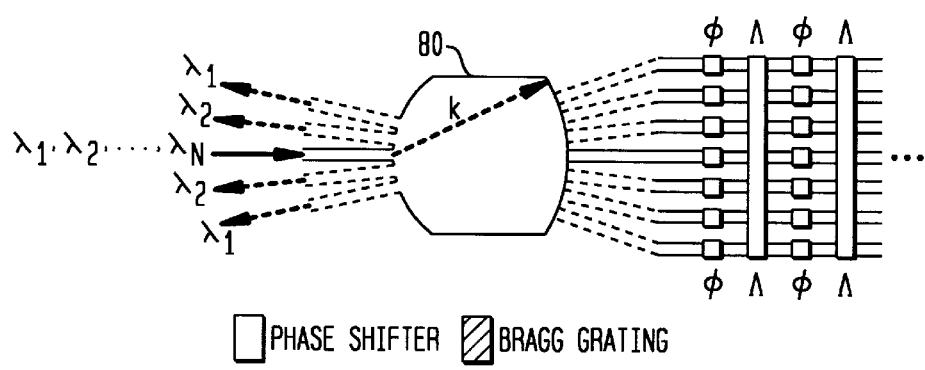
FIG. 8 schematically depicts an alternative embodiment of a filter employing a star coupler.

Similarly, an N×N add/drop can be configured as shown in FIG. 8 using a star coupler 80. The structure and operation of a star coupler are well known. See C. Dragone, "Efficient N×N star coupler based on Fourier Optics," *Electronics Lett.*, vol. 24, no. 15, pp. 942–944 (1988). The light reflected from a grating $\Lambda_i$ re-enters the diffraction region of the coupler. A linear phase across the array causes the light to focus on one of the output waveguides. By changing the linear phase shift, a different output waveguide can be chosen. Typically, higher order arrays are used, meaning that a path length difference exists between each waveguide in the array. The path length difference, $\Delta L$, provides the wavelength dependent focusing used for a transmissive multiplexer/demultiplexer device. For the architecture shown in FIG. 8, however, the wavelength dependence is provided by the gratings so the optical path lengths for each of the array guides can be equal. The focal point is found where the light from all the array waveguides interferes constructively, as given by the following equation:

$$m\lambda = dn_s \sin \theta_j + \Delta n_e L_{Htr} + n_e \Delta L \tag{9}$$

where j is the jth output waveguide, $n_s$ is the slab index, $\Delta n_e$ is the effective index change over the phase shifter length of $L_{Htr}$, d is the separation between the array waveguides, $\theta_j = j\Delta x/R$, $\Delta x$ is the separation between the output waveguides, R is the object and image distance of the star coupler, $\Delta L$ is the path length difference between the array waveguides, and m is an integer and is also called the order of the array. Assuming that $m\lambda = n_e \Delta L$, the following phase shift per array waveguide is calculated from equation (9):

$$\Delta n_e = -\frac{jd\Delta x n_s}{2RL_{Htr}} \tag{10}$$

The factor 2 in the denominator arises because there are two passes through each phase shifter. For R=600 μm, $\Delta x$=d=20 μm, $L_{Htr}$=5 mm and $n_s$=1.45, an index change of $96 \times 10^{-6}$ is needed for j=1 which corresponds to a phase change of 0.62π.

A distinct advantage of these architecture is the ability to drop multiple wavelengths onto one or several fibers from a single fiber and the ability to add multiple wavelengths from several fibers onto a common fiber. It is assumed that the wavelengths are not duplicated between any of the add/drop fibers. Previous architectures require each fiber pair to have a demultiplexing and multiplexing device. In addition, the trunk fiber must have a switch in between the demux/mux to either pass the wavelength to the output or drop it and add another signal. The grating/phase shifter architectures provides a simplified, low loss add/drop.

Thus applicant has disclosed a new class of filters combining a splitting device with reflective, wavelength-selective filters and broadband phase shifters to perform wavelength-selective interference-based switching. The new filter comprises an optical splitting device for dividing a guided optical beam into two or more substantially identical guided beams. Exemplary splitting devices include a directional coupler, a Mach-Zehnder interferometer, a multimode interference coupler and a star coupler. The device typically includes three sets of waveguides: a first set comprising an input waveguide coupled to the splitter for providing a multiwavelength guided optical signal to be filtered. The second set comprises a plurality of waveguides (which can be called intererometer waveguides) coupled to the splitter for receiving the plurality of beams produced by splitting. The intererometer waveguides are provided with an alternating sequence of phase shifters and reflection filters such as Bragg gratings for reflecting back into the splitter, specific wavelengths from specific interferometer waveguides. A third set of output waveguides are coupled to the splitter for receiving respective reflected wavelengths.

In operation, the optical input is first split into two or more output arms of the splitting device in a wavelength independent manner. Then, a phase shifter and identical wavelength-selective, reflection filters (for example, Bragg gratings) are introduced in each arm. By setting each phase shifter appropriately, the reflected signal is directed into the desired output arm. The other wavelengths remain unaffected and pass through the first filter with relative phase change between the arms. Another phase shifter/filter combination is then used to control the output of the second wavelength range, and so forth. The setting of the phase shifters varies among the architectures since it is dependent on the splitting device.

The new switchable optical filter can function as a gain equalizer, an add/drop multiplexer or a cross connect. It offers active tuning so that each channel can be varied independently. The architecture is compact, since it relies on only the grating's reflection characteristics and has two or three directional couplers. This makes the switch advantageous for planar waveguide implementation. By writing wider gratings, wavelength bands may be manipulated instead of single wavelength channels, thus reducing the number of required grating/phase shifter pairs. The filter also has low loss. A perfect 50% splitting in the MZI arms can be accomplished even with fabrication variations on each coupler. This reduces crosstalk to acceptable levels and decreases the wavelength dependence of the crosstalk. The architecture was extended to the 1×N case using both MMI and star couplers as splitting devices.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. An optical filter comprising:
   a Mach-Zehnder interferometer comprising a pair of optical waveguide arms extending between a pair of directional couplers,
   said pair of arms including an alternating sequence of a phase shifter on at least one arm and a pair of reflective filters, one on each arm.

2. The optical filter of claim 1 wherein one of the directional couplers of said interferometer is coupled to at least one optical circulator to provide an additional port.

3. The optical filter of claim 2 wherein each arm of said directional coupler is coupled to a respective optical circulator to provide a pair of input ports and a pair of output ports.

4. An optical cross connect for interconnecting a plurality of optical fibers comprising a plurality of optical filters according to claim 3 coupled together via their optical circulators.

5. The optical filter of claim 1 wherein said reflective filters are Bragg gratings.

6. The optical filter of claim 1 wherein said reflective filters in each pair reflect the same wavelength.

7. The optical filter of claim 1 wherein successive pairs of reflective filters in said sequence reflect at different wavelengths.

8. The optical filter of claim 1 wherein said phase shifters are controllable phase shifters.

9. The optical filter of claim 1 further comprising an additional directional coupler and a controllable phase shifter coupled to one of said pair of directional couplers for facilitating identical splitting of an input guided beam.

10. A switchable optical filter comprising:
    an optical splitter and, coupled thereto, an input waveguide, a plurality of interferometer waveguides and one or more output waveguides;
    said optical splitter coupled to said input waveguide for receiving from said input waveguide a multiwavelength optical signal of wavelengths $\lambda_1, \lambda_2, \ldots, \lambda_n$, and splitting said signal into a plurality of multiwavelength split signals;
    said optical splitter coupled to said interferometer waveguides for providing split signals to respective interferometer waveguides;
    said interferometer waveguides including controllable phase shifters and reflective filters for controllably reflecting from each interferometer waveguide to said optical splitter a respective reflected wavelength signal $\lambda_i$; and
    said optical splitter coupled to said one or more output waveguides for directing said reflected wavelength signals to respective output waveguides, whereby specific wavelength signals $\lambda_i$ are filtered and presented on respective output waveguides.

11. A switchable filter according to claim 10 wherein said splitting device comprises a directional coupler.

12. A switchable filter according to claim 10 wherein said splitting device comprises a star coupler.

13. A switchable filter according to claim 10 wherein said splitting device comprises a multimode interference coupler.

14. A switchable filter according to claim 10 further comprising an optical circulator coupled to said input waveguide.

15. A switchable filter according to claim 10 further comprising one or more optical circulators respectively coupled to one or more of said output waveguides.

* * * * *